United States Patent

[11] 3,571,946

| [72] | Inventors | Joachim Karweil<br>Essen;<br>Josef Degel, Bochum, Germany |
|---|---|---|
| [21] | Appl. No. | 845,238 |
| [22] | Filed | July 28, 1969 |
| [45] | Patented | Mar. 23, 1971 |
| [73] | Assignee | Bergwerksverband GmbH<br>Essen, Germany |
| [32] | Priority | July 26, 1968 |
| [33] | | Germany |
| [31] | | P 17 69 859.8 |

[54] REACTOR FOR REACTIVATING SOLID PARTICULATE MATERIAL WITH A GASEOUS MEDIUM
19 Claims, 4 Drawing Figs.

[52] U.S. Cl. ................................................. 34/57, 23/284
[51] Int. Cl. ........................................... F26b 17/10
[50] Field of Search ............................ 34/57 (A), 10; 23/288.3 (S), 284; 263/21 (A)

[56] References Cited
UNITED STATES PATENTS
| 2,925,330 | 2/1960 | Knops | 34/57A.X |
| 3,002,805 | 10/1961 | Browning, Jr. et al. | 34/57A.X |

Primary Examiner—Frederick L. Matteson
Assistant Examiner—Robert A. Dua
Attorney—Michael S. Striker ABSTRACT: A reactor for reactivating solid particulate material with a fluid comprising a reaction chamber including a perforated bottom wall and upright wall means disposed on the bottom wall and defining within the reaction chamber a central whirl chamber and a first and a second annular whirl chamber surrounding the central whirl chamber. Passageways are provided in the wall means to interconnect the respective whirl chambers. A first inlet is provided to supply solid particulate material to the central whirl chamber and a second inlet communicates with the perforated bottom wall to supply a fluid therethrough to fluidize the particulate material in the central whirl chamber. The particulate material in fluidized condition is subsequently transferred to an outlet via the first and second annular whirl chambers.

INVENTORS:
JOACHIM KARWEIL
JOSEF DEGEL

INVENTORS:
JOACHIM KARWEIL
JOSEF DEGEL

3,571,946

REACTOR FOR REACTIVATING SOLID PARTICULATE MATERIAL WITH A GASEOUS MEDIUM

BACKGROUND OF THE INVENTION

The present invention relates to a reactor of the type employing a fluidized bed for reactivating solid particulate material and in particular contaminated carbonaceous adsorption materials, especially activated carbon.

With subsiding of their acitivity, carbonaceous adsorption materials, such as coalites from mineral coals and lignites and in particular activated carbon, are subjected to a reactivating process in which the impurities contained in such materials are expelled therefrom by means of gasification with steam or carbon dioxide at temperatures ranging between 600° C. to 1000° C.

It is known to carry out such a process in a rotary drier or a story furnace. These types of furnaces, however, are uneconomical and expensive while, in addition, the material exchange between the matter to be reactivated and the reactivating fluid is inefficient.

It is further known, to effect reactivation of activated carbon in reactors of the type employing a fluidized bed in which the material exchange is considerably better. On the whole, however, such reactors are only effective for those materials which can also be subjected to and are responsible to a whirling process.

As a rule, the contaminated carbonaceous materials are wet or at least moist or sticky and for that reason such materials hitherto could only be reactivated in a fluidized bed reactor after first having been subjected to a particular predrying process. In order to render such materials effective for such a reactor, the water contents of these materials, which may exist at a ratio of between 10—200 parts by weight of water for each 100 parts by weight of dry activated carbon, must first be expelled therefrom. This latter water expulsion process, so far, has been carried out in a separate reactor in the form of a drier.

It will be appreciated that such an arrangement is uneconomical and expensive.

SUMMARY OF THE INVENTION

Object of the present invention is to provide a reactor of the type employing a fluidized bed in which the respective, discrete steps of treating the particulate material, including predrying, fluidizing and reactivating the material, are carried out without the necessity of auxiliary reactors or dryers.

Such a reactor according to the invention essentially comprises a reaction chamber including a perforated bottom wall and upright concentrically arranged wall means disposed on the perforated bottom wall and defining within the reaction chamber a central whirl chamber and at least one annular whirl chamber surrounding the central whirl chamber with passage means provided in the wall means to interconnect the respective chambers. A first inlet communicates with the central chamber for the introduction therein of particulate material and a second inlet communicates with the perforated bottom wall for the passage therethrough of a fluid to fluidize the particulate material disposed on the perforated bottom wall and subjected to a whirling process. An outlet is provided which communicates with the annular whirl chamber to release therefrom fluidized particulate material transferred in fluidized condition to the annular whirl chamber from the central whirl chamber. The outlet being arranged so that it communicates with the annular whirl chamber at a portion of the circumference thereof circumferentially offset relative to the passage means interconnecting the chambers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
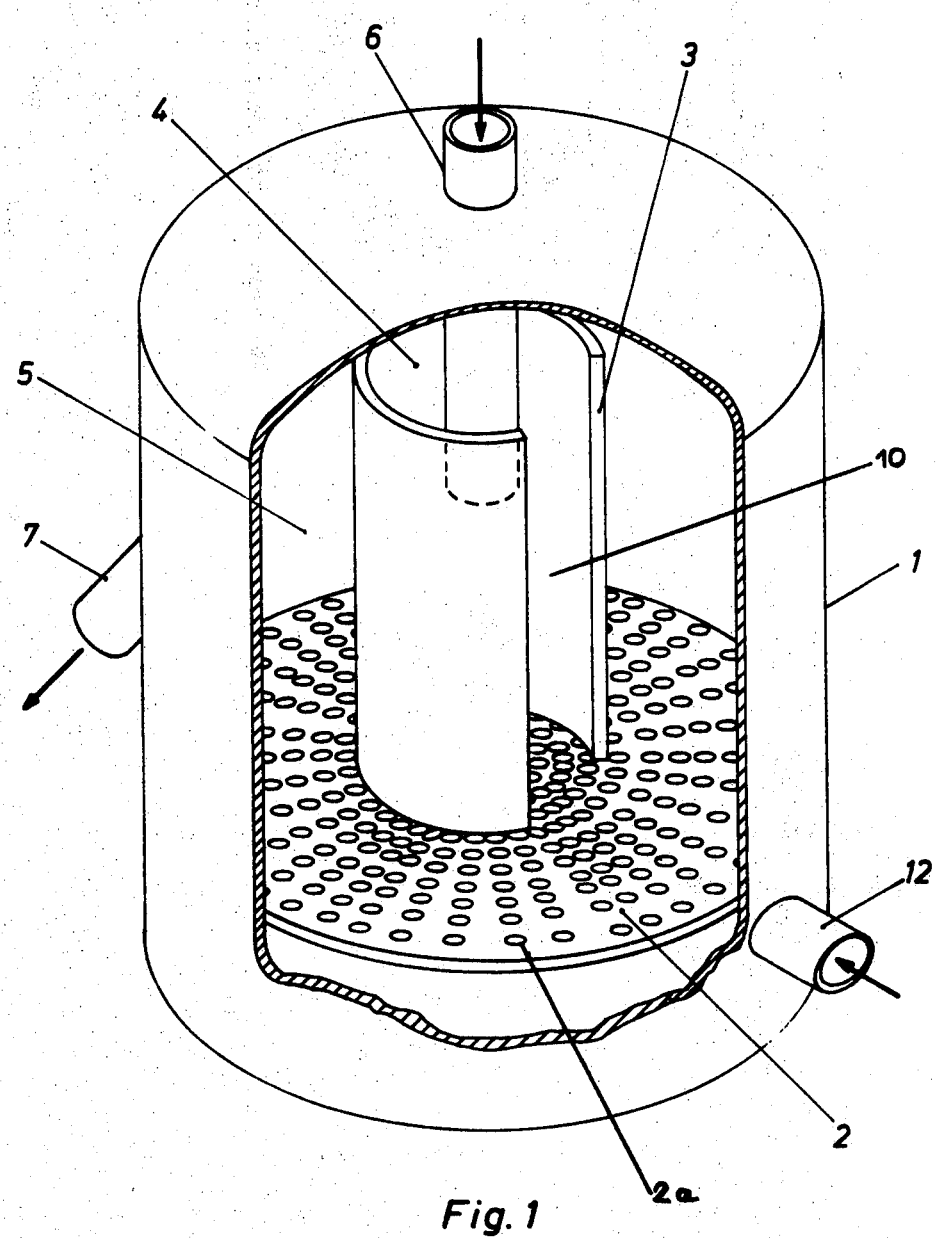
FIG. 1 is a perspective view of the fluidized-bed reactor according to the present invention.
Figure 2:
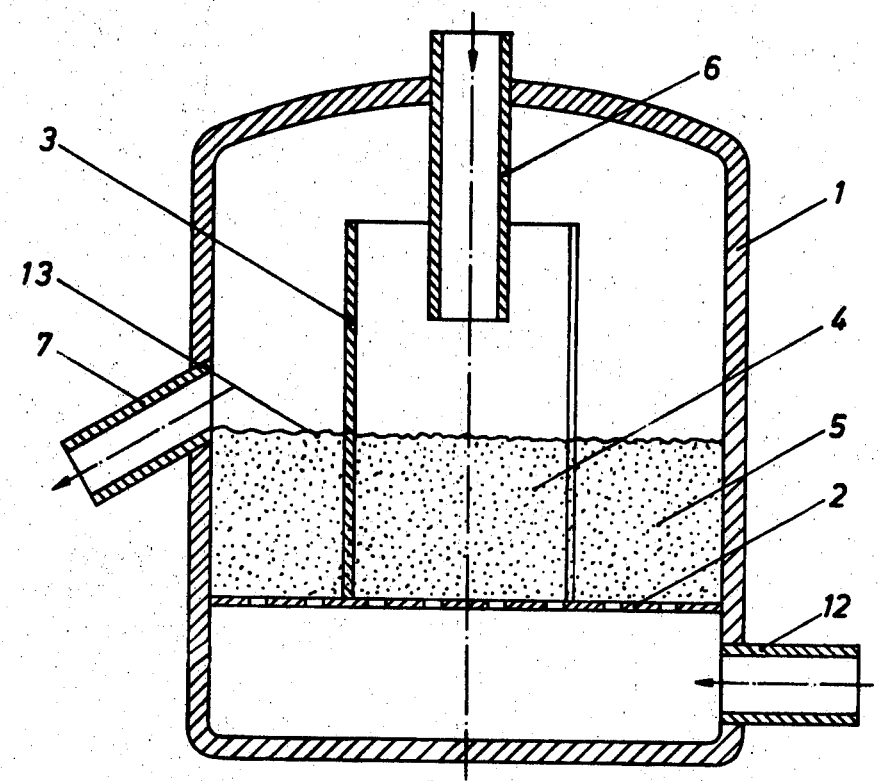
FIG. 2 is a schematic longitudinal cross-sectional view through the reactor of FIG. 1.

Referring now to the drawings in which like reference numerals index like parts, the fluidized-bed reactor shown in FIG. 1, is seen to comprise a reactivating chamber 1 which includes a bottom wall 2 provided with a plurality of perforations 2a. Projected upwardly from the bottom wall is at least one wall member 3 which defines within the chamber 1 a central whirl chamber 4 and an annular whirl chamber 5. A passage in the form of slot 10 interconnects the chambers 4 and 5 and extends axially upwardly with the wall member 3. Disposed at the top of the reactor is an inlet 6 which extends into the central chamber 5 for the introduction therein of particulate material which when introduced and as shown in FIG. 2, is first deposited onto the bottom wall 2 inside the chamber 5. The particulate material is now subjected to a vigorous whirling process and fluidization by a gaseous medium supplied thereto via an inlet 12 disposed beneath the bottom wall 2 and communicating with the perforations 2a therein for the passage therethrough into the material to be treated. Upon fluidization of the particulate material the same is then transferred to the chamber 5 via the slot 10 and is subsequently and under less vigorous whirling, expelled from the reactor via an outlet of which, as shown in FIG. 2, is preferably arranged so that its lowest region at its upper end lies at a level which corresponds with the upper level of the particulate material so as to effect smooth expulsion of the latter from the reactor. Less vigorous whirling in the annular chamber 5 further effects smooth expulsion of the material through outlet 7 without revertive mixing of the material such that an overall uniform degree of reactivation is obtained.

As illustrated, the chamber 1 is substantially cylindrical and the wall member 3 contained therein is substantially annular, however, the latter may equally well be elliptical or square-shaped.

The slot 10 preferably is dimensioned so that it corresponds to about one-half of the diameter of the bottom wall 2 and preferably has a height of about 0.5—0.75 of the height of the chamber 1 so as to avoid sideskipping of the material contained in the respective chambers.

Figure 3:
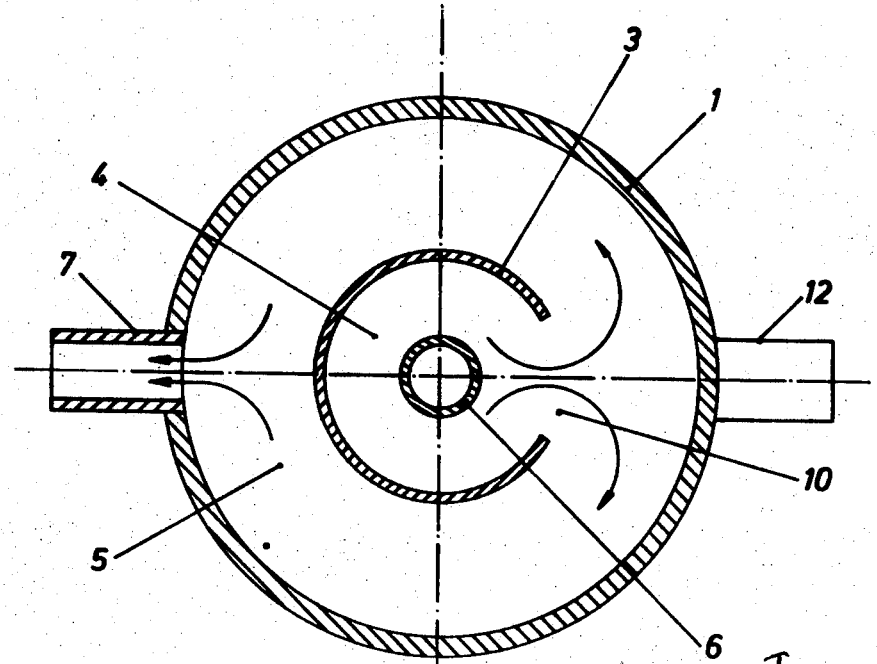
FIG. 3 is a top view of the reactor of FIG. 1, employing a single wall member.

The wall member 3 preferably is made of sheet metal or a ceramic, and the slot 10 formed therein is arranged so that it interconnects the central chamber 4 and the surrounding annular chamber 5 at a location which is displaced at 180° relative to the outlet 7 so that the material transferred from the chamber 4 to the chamber 5 is duly processed, i.e. fluidized, prior to being expelled from the reactor. FIG. 3 illustrates the direction in which the material travels when transferred from chamber 4 to chamber 5.

Figure 4:
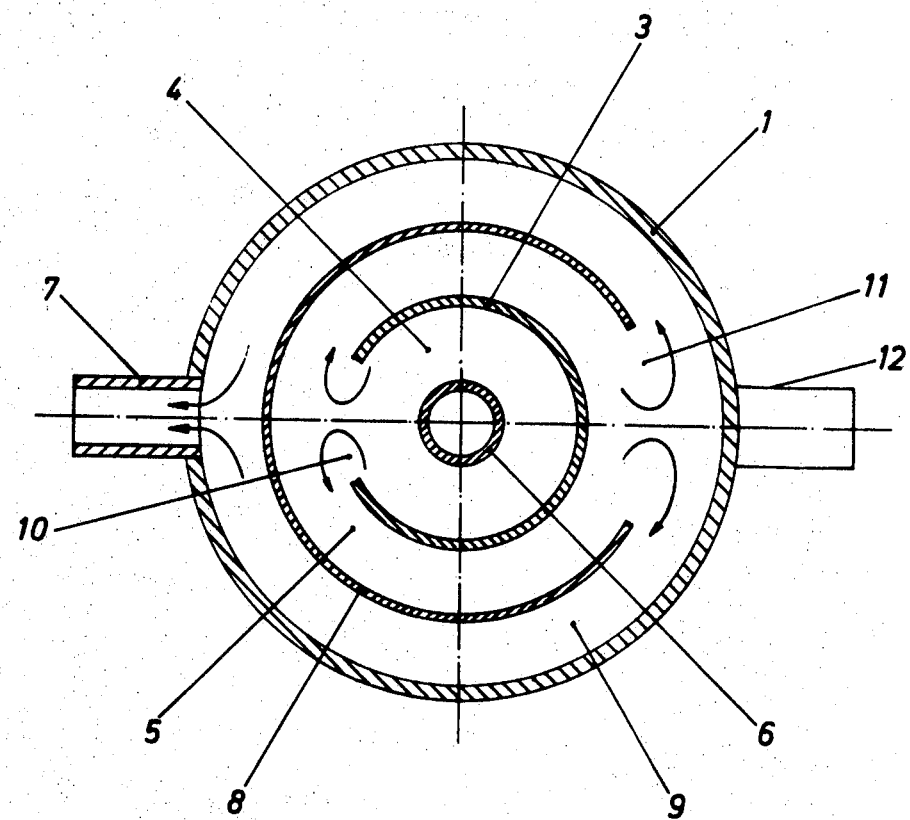
FIG. 4 is a top view of an alternative arrangement of the reactor of FIG. 1, employing two wall members.

Shown in FIG. 4 is the arrangement in which the reactor of FIG. 1 is provided with a second wall member 8 which further defines within the reactivating chamber 1 a second annular chamber 9 surrounding the chambers 4 and 5 and concentrically arranged therewith.

The wall member 8 is constructed and arranged in a manner identical to that of wall member 3 and, likewise, is provided with a passage 11 which interconnects the chamber 5 with the chamber 9. In this embodiment, however, the passage 10 in the wall member 3 is radially aligned with the outlet 7 across that portion of the wall member 8 which is positioned diametrically opposite the passage 11 while the passage 11 in the wall member 8 is displaced 180° relative to passage 10 and 180° relative to outlet 7. In this manner, the material treated in the respective chambers can only then exit from the reactor after having been duly processed in these chambers.

It will be appreciated that depending on the size and application of the reactor, and in addition to the arrangements shown in FIGS. 1 and 4, any given number of wall members may be used to subdivide the chamber 1 in a plurality of whirl chambers.

To this end, and as regards the present invention, by dividing the bottom wall 2 in different zones, wet deactivated materials may be converted into high-quality reactivated material.

The surface of the central whirl chamber 4 is dimensioned so that it corresponds to at least 10 percent but preferably 30-—50 percent of the total bottom wall surface.

The reactivation process of the material in the central whirl chamber may be increased by reducing the distance between the discrete perforations in the bottom wall in this section of the chamber or by increasing the diameter of the perforations with 1.1—1.5 times relative to the diameter of the perforations in the surrounding annular whirl chambers.

A particularly advantageous operation of the reactor is accomplished when the latter is arranged so that the free spaces of the bottom wall in the area confined within the central whirl chamber is about 1.2—2.25 times the free spaces in the annular whirl chambers.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

We claim:

1. A reactor for reacting solid particulate material with a gaseous medium, comprising, a reaction chamber including a perforated bottom wall, upright wall means defining within said reaction chamber a central whirl chamber and an annular whirl chamber surrounding said central whirl chamber; passage means in said wall means along a portion of the circumference thereof connecting said central whirl chamber with said annular whirl chamber, each of said whirl chambers being connected at its bottom by a portion of said perforated bottom wall; first inlet means for said solid particulate material communicating with said central whirl chamber; second inlet means for said gaseous medium communicating with said perforated bottom wall of said reaction chamber for admitting said gaseous medium therethrough so as to fluidize said solid particulate material in said central whirl chamber and to transfer it in fluidized condition through said passage means into said annular whirl chamber where it is further fluidized and reacted with said gaseous medium; and an outlet communicating with said annular whirl chamber at a portion of its circumference circumferentially offset relative to said passage means and serving for removing the reacted solid particulate material and gaseous medium.

2. A reactor as defined in claim 1, wherein said reaction chamber is substantially cylindrical and wherein said upright wall means is substantially ring-shaped.

3. A reactor as defined in claim 1, wherein said upright wall means is substantially annular and wherein said passage means is a slot formed in said wall means and extending axially therewith upwardly from said perforated bottom wall.

4. A reactor as defined in claim 1, wherein said central whirl chamber extends concentrically relative to said reaction chamber and wherein said first inlet means extends substantially coaxially with said central whirl chamber.

5. A reactor as defined in claim 1, wherein said reaction chamber includes a top portion and wherein said first inlet means is a duct which extends through said top portion into said central whirl chamber.

6. A reactor as defined in claim 1, wherein said second inlet means is a conduit and extends beneath said perforated bottom wall.

7. A reactor as defined in claim 1, wherein said outlet communicates with said annular wall chamber at a portion thereof circumferentially opposite said passage means.

8. A reactor as defined in claim 1, wherein said upright wall means includes second upright wall means concentrically surrounding said annular whirl chamber and defining within said reaction chamber a second whirl chamber, said second wall means having passage means along a portion of its circumference connecting said first mentioned annular whirl chamber with said second annular whirl chamber.

9. A reactor as defined in claim 8, wherein said outlet communicates with said second annular whirl chamber at a portion thereof circumferentially offset relative to said passage means in said second whirl chamber.

10. A reactor as defined in claim 8, wherein said second upright wall means is substantially annular, and wherein said passage means is a slot formed in said second wall means and extending axially therewith upwardly from said perforated bottom wall.

11. A reactor as defined in claim 10, wherein said passage means is formed in said second upright wall means at a portion of the circumference thereof circumferentially offset relative to said passage means in said first mentioned upright wall means.

12. A reactor as defined in claim 11, wherein said passage means in said second upright wall member is formed at a portion thereof circumferentially opposite said passage means in said first mentioned upright wall means.

13. A reactor as defined in claim 9, wherein said outlet communicates with said second annular whirl chamber at a portion thereof circumferentially opposite said passage means in said second annular whirl chamber.

14. A reactor as defined in claim 1, wherein said wall means is substantially elliptical.

15. A reactor as defined in claim 1, wherein said wall means is substantially square-shaped.

16. A reactor as defined in claim 1, wherein said portion of said perforated bottom wall connecting said central whirl chamber corresponds to at least 10 percent of the total surface of said perforated bottom wall.

17. A reactor as defined in claim 1, wherein said portion of said perforated bottom wall connecting said central whirl chamber corresponds to maximum 50 percent of the total surface of said perforated bottom wall.

18. A reactor as defined in claim 1, wherein said perforated bottom wall comprises a plurality of discrete perforations, and wherein the diameter of said perforations defined within the area of said central whirl chamber is at least 1.1 times larger than the diameter of the perforations defined within the area of said annular whirl chamber.

19. A reactor as defined in claim 18, wherein the diameter of said perforations defined within the area of said central whirl chamber is not larger than 1.5 times the diameter of said perforations defined within the area of said annular whirl chamber.